(12) United States Patent
Muppirala et al.

(10) Patent No.: US 8,301,805 B2
(45) Date of Patent: Oct. 30, 2012

(54) MANAGING I/O REQUEST IN A STORAGE SYSTEM

(75) Inventors: Kishore Kumar Muppirala, Karnataka (IN); Sumanesh Samanta, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 163 days.

(21) Appl. No.: 12/626,628

(22) Filed: Nov. 26, 2009

(65) Prior Publication Data

US 2011/0066770 A1    Mar. 17, 2011

(30) Foreign Application Priority Data

Sep. 15, 2009    (IN) .......................... 2226/CHE/2009

(51) Int. Cl.
 *G06F 5/00* (2006.01)
 *G06F 15/16* (2006.01)
 *H04L 12/56* (2006.01)

(52) U.S. Cl. ................ 710/5; 710/39; 710/29; 709/233; 370/412

(58) Field of Classification Search .................... 710/39, 710/29, 5; 709/233; 370/412
See application file for complete search history.

(56) References Cited

U.S. PATENT DOCUMENTS

| | | | |
|---|---|---|---|
| 6,262,986 B1* | 7/2001 | Oba et al. ....................... | 370/399 |
| 6,314,177 B1* | 11/2001 | Davis et al. .............. | 379/265.12 |
| 6,876,952 B1* | 4/2005 | Kappler et al. ................ | 702/187 |
| 7,647,444 B2* | 1/2010 | Dignum et al. ................ | 710/241 |
| 7,680,139 B1* | 3/2010 | Jones et al. .................... | 370/414 |
| 2004/0153564 A1* | 8/2004 | Lakkakorpi ................... | 709/232 |
| 2008/0005392 A1* | 1/2008 | Amini et al. ..................... | 710/29 |
| 2008/0186989 A1* | 8/2008 | Kim ............................. | 370/412 |
| 2008/0219279 A1* | 9/2008 | Chew ............................. | 370/412 |
| 2008/0270657 A1* | 10/2008 | Tsai et al. ...................... | 710/114 |
| 2010/0118883 A1* | 5/2010 | Jones et al. .................... | 370/412 |

OTHER PUBLICATIONS

Cho, Dynamic Queue Scheduling Using Fuzzy Systems for Internet Routers, 2005, iEEE, pp. 1-6.*

* cited by examiner

*Primary Examiner* — Ernest Unelus

(57) ABSTRACT

The present invention relates to managing I/O requests in a storage system. By dynamically changing the scheduling parameters to achieve optimal turn around time for I/O requests pending for processing at a component in the storage system. The scheduling parameters are changed based on a feedback mechanism. The turn around time of the I/O request are calculated as the ratio of I/O request processing rate and the average number of I/O requests in the component.

18 Claims, 5 Drawing Sheets

MANAGING I/O REQUEST IN A STORAGE SYSTEM

RELATED APPLICATIONS

Benefit is claimed under 35 U.S.C. 119(a)-(d) to Foreign application Serial No. 2226/CHE/2009 entitled "Managing I/O Request in a Storage System" by Hewlett-Packard Development Company, L.P., filed on 15 Sep. 2009, which is herein incorporated in its entirety by reference for all purposes

BACKGROUND

In a storage system, Input/Output or I/O request refers to a communication between a storage device and the host system. The host system will generally make I/O request to a data storage subsystem. The inputs are signals or data received by the storage system, and the outputs are signals or data sent by the storage devices. For efficiency each host can accumulate a batch of I/O requests from users and transmit them to the data storage subsystem. When a storage device is serving multiple hosts the quality of service (QoS) in terms of performance delivered to the host or to different applications running on the same host may vary depending on the overall load on the storage device. There have been multiple implementations to deliver different QoS to different workloads using various scheduling algorithms such as deadline scheduling algorithm.

In the storage system, a number of different devices generally cooperate in order to process a plurality of I/O requests, the result of which is that some devices or components within a system may operate closer to their operating capacity than others, possibly resulting in the creation of processing bottlenecks. In the prior art, service provided by various service components may be distributed among a plurality of tasks by first assigning priority levels to each of the plurality of tasks and then employing a prioritization algorithm, such as time sharing, to determine the distribution of service among the plurality of tasks according to the various priority levels. Where the priority rules for deciding for the processing of the I/O request on components, the data storage system will generally be unable to optimize its performance effectively at run time. Thus, if a data processing application yields a situation in which one of the components is slow in processing, the systems of the prior art will generally continue to process the I/O requests without modification at run time. Accordingly, a processing bottleneck could occur as a consequence of fixing processing priorities prior to beginning program execution.

BRIEF DESCRIPTION OF THE DRAWINGS

Embodiments of the present invention are illustrated by way of example only and not limited to the figures of the accompanying drawings, in which like references indicate similar elements and in which.

Other features of the present embodiments will be apparent from the accompanying drawings and from the detailed description that follow.

DETAIL DESCRIPTION

A system and method for managing I/O requests in a storage system is described. In the following detailed description of various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
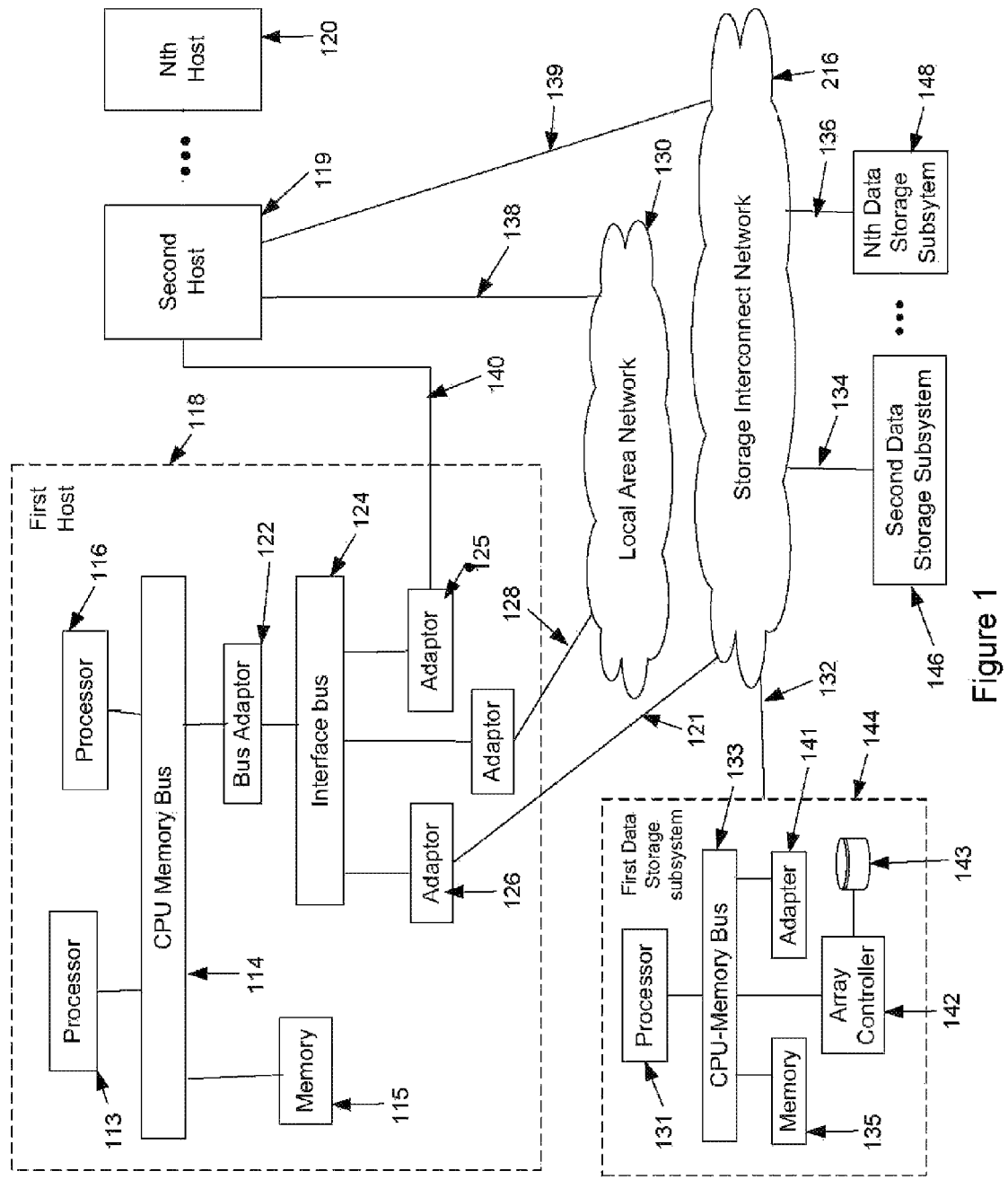
FIG. 1 illustrates a storage system comprising multiple hosts and multiple storage subsystems.

FIG. 1 illustrates a data storage system that includes first through Nth hosts 118, 119 and 120, and first through Nth data storage subsystems 144, 146 and 148. Each host is a computer that can connect to clients, data storage subsystems and other hosts using software/hardware interfaces such as network interface cards and software drivers to implement Ethernet, Fibre Channel, ATM, SCSI, InfiniBand, etc. Each host runs an operating system such as Linux, UNIX, a Windows OS, or any suitable operating system.

FIG. 1 shows the first host 118 includes a CPU-memory bus 114 that communicates with the processors 113 and 116 and a memory 115. The processors 113 and 116 used are not essential to the invention and could be any suitable general-purpose processor such as an Intel Pentium processor, an ASIC dedicated to perform the operations described herein, or a field programmable gate array (FPGA). Each host includes a bus adapter 122 between the CPU-memory bus 114 and an interface bus 124, which in turn interfaces with network adapters 117, 125 and 126.

The first host 118 communicates through the network adapter 125 over a link 140 with a second host 119. The first host 118 can also communicate through the network adapter 117 over link 128 with the local area network (LAN) 130. The first host 118 also communicates through a host bus adapter 126 over a link 121 with a storage interconnect network 129. Similarly, the second host 119 communicates over links 138 and 139 with the LAN 130 and the storage interconnect network 129, respectively. The storage interconnect network 129 also communicates over links 132, 134, and 136 with the data storage subsystems 144, 146, and 148, respectively.

In sum, the hosts 118, 119 and 120 communicate with each other, the LAN 130 and storage interconnect network 129 and data storage subsystems 144, 146, and 148. The LAN 130 and the storage interconnect network 129 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention.

FIG. 1 illustrates the first data storage subsystem 144 which includes a CPU-memory bus 133 that communicates with the processor 131 and a memory 135. The processor 131 used is not essential to the invention and could be any suitable general-purpose processor such as an Intel Pentium processor, an ASIC dedicated to perform the operations described herein, or a field programmable gate array (FPGA). The CPU-memory bus 133 also communicates through an adapter and link 132 with the storage interconnect network 129 and an array controller 142, interfacing with an array of storage disks, wherein the array controllers disks form a disk array 143. In an alternative embodiment, any other suitable storage devices can replace the disk arrays such as an array of tape drives or an array of nonvolatile semiconductor memory.

A host may access secondary storage (e.g., disk drives) through a LUN (logical unit number) that abstracts the physical disk(s) as a linear array of fixed-size blocks. A logical block address (LBA) identifies each fixed-sized block. The data storage system constructs a LUN from all or parts of several physical storage devices such as disk drives. To make a large LUN, a data storage system may concatenate space allocated from several storage devices. To improve performance, the data storage system maps adjacent regions of LUN space onto different physical storage devices (striping).

In operation, a user requests an I/O operation of one of the hosts 118, 119, or 120 which will transmit the request on the LAN 130 or the storage interconnect network 129 to one of the data storage subsystems 144, 146, or 148. If a write is received, the data storage subsystem 144 can use a write-through scheme and not acknowledge the write until the data is written to storage disks (e.g., disk array 143). This ensures data consistency between the host and data storage subsystem in the event of a power failure, etc. In a write-back scheme, the data storage subsystem 144 can acknowledge the write before data is written to a disk array 143 as long as the data is stored in another form of nonvolatile memory (e.g., battery backed RAM) until written to the storage disks to again ensure data consistency.

Figure 2:
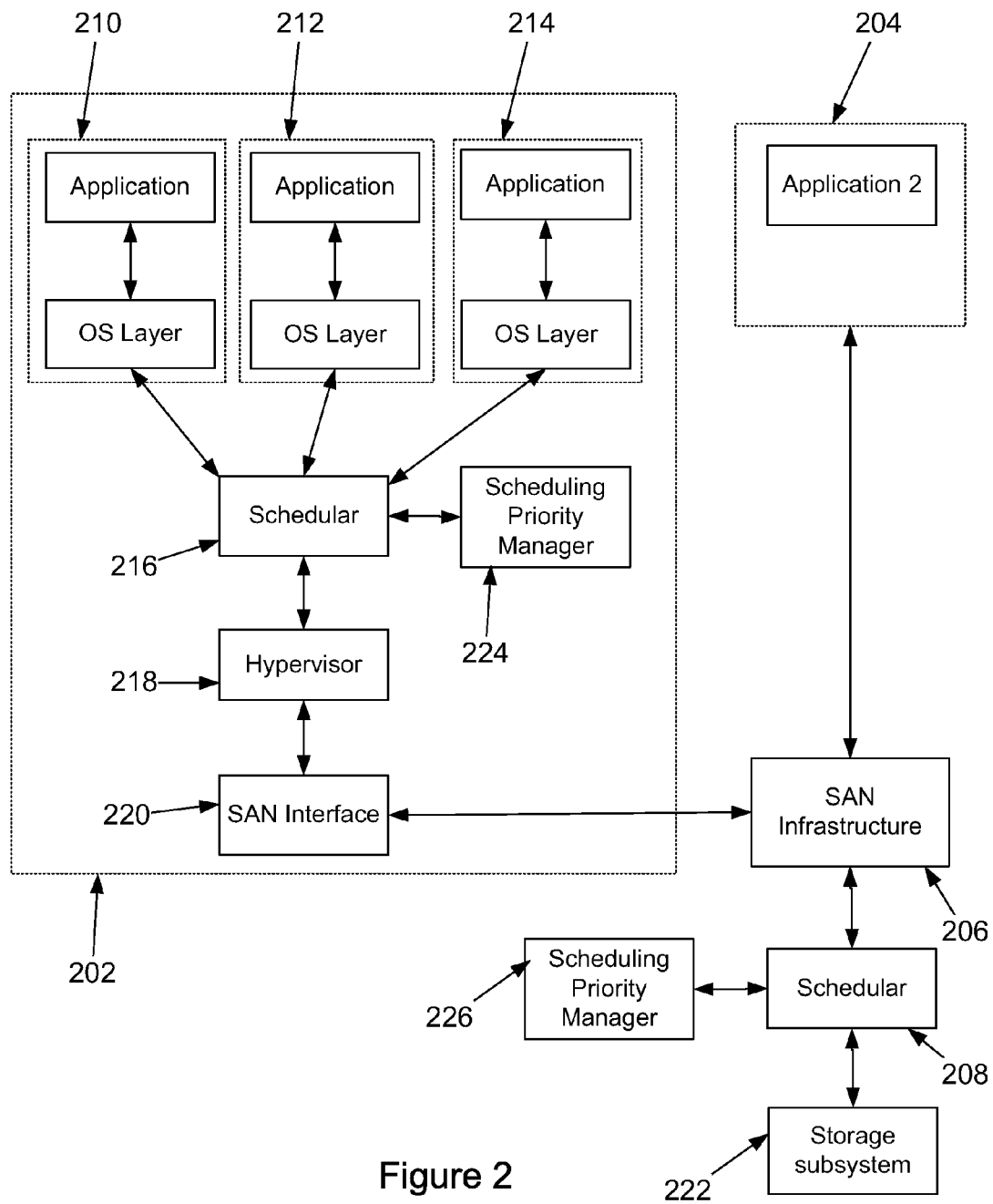
FIG. 2 illustrates a plurality of hierarchical components involved in the processing of the I/O requests in the storage system.

FIG. 2 illustrates the plurality of hierarchical components involved in the processing of the I/O requests in the storage system. The storage system may comprise a plurality of hosts (202, 204) connected to a storage subsystem 222 via a network 206. The network 206 may be a storage area network infrastructure. The storage subsystem 222 may comprise plurality of storage disks for storing data. A scheduler 208 may be deployed on the storage subsystem 222 to manage the I/O request on the storage subsystem 222.

As illustrated in FIG. 2, as an example, a plurality of applications (210, 212, 214) may be running on the host (202). A plurality of operating system layers may be supporting the applications running on hosts. The host may further comprise a scheduler (216), a hypervisor (218) and a SAN interface (220). According to an example embodiment at least one scheduler may be attached to each of the host components to manage I/O requests on the component. Although FIG. 2 illustrates only one scheduler (216) deployed between operating system layer and hypervisor (218), a scheduler may be deployed between the hypervisor (218) and SAN interface (220).

The scheduler (208) and scheduler (216) may be a multi queue scheduler. The multi queue scheduler may be deployed when more than two components are accessing a common resource. In FIG. 2, there are two hosts (202, 204) accessing a common storage device (222). A multi-queue scheduler may classify the incoming I/O requests into multiple queues, based on a predetermined classification mechanism. The multi queue scheduler then may select and schedule I/O requests to the next component in the storage system. According to an example embodiment the scheduler may be connected to a plurality of scheduling parameter manager (224, 226). The scheduling parameter manager (224, 226) may determine a turn around time of the I/O request on a component, assign a scheduling parameter to the I/O request queues and dynamically modify the assigned scheduling parameters based on the determined turn around time.

Figure 3:
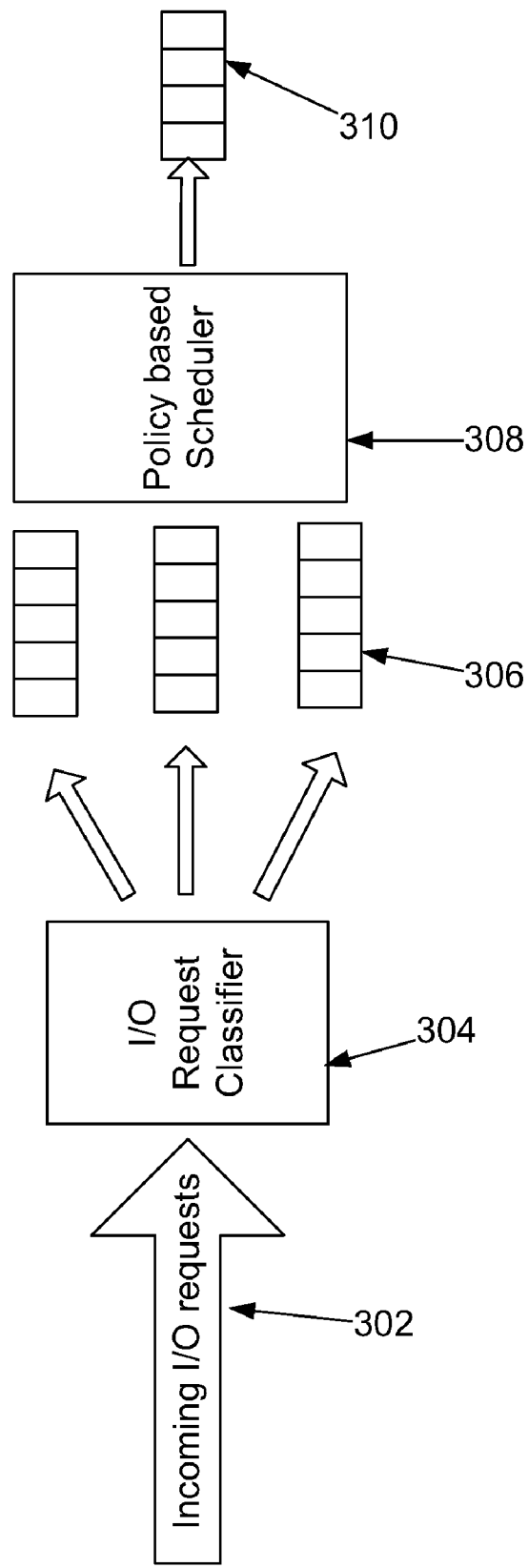
FIG. 3 illustrates the different stages in a multi-queue scheduling process on a component of a storage system.

FIG. 3 illustrates steps involved in a multi-queue scheduling process on a component of a storage system. At step 302, the multi queue scheduler may receive the I/O requests for processing on a component. The I/O request may comprise a classifier attached with it. At step 304, the multi queue scheduler may classify the I/O requests based on classification criteria. The classification criteria may be predefined by a storage system administrator. As an example the I/O request may be classified based on the host, the application running on the host and OS layer. At step 306, the multi queue scheduler may create a plurality of I/O request queues based on the classification criteria and classify the I/O requests in the created I/O request queues. At step 308, the multi queue scheduler may schedule the I/O request from at least one I/O requests queue for processing on the component based on a predetermined scheduling policy. The predetermined scheduling policy may comprise assigning scheduling parameters to the I/O requests queues and scheduling the I/O requests from the I/O requests queues based on the scheduling parameters assigned to the I/O requests queues.

Figure 4:
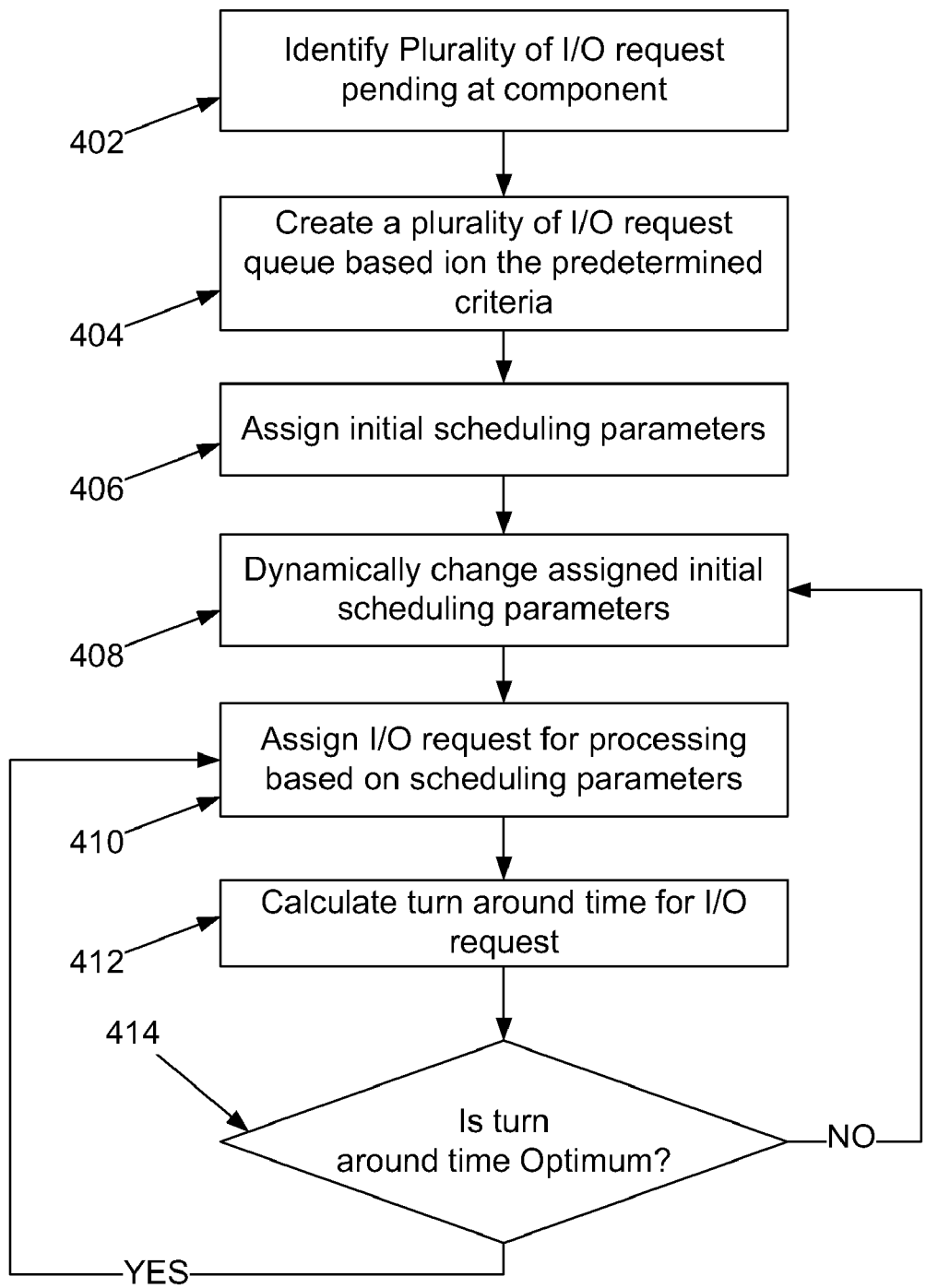
FIG. 4 illustrates the steps of a method for managing I/O requests in a component in a storage system

FIG. 4 illustrates the steps of a method for managing I/O requests in a component in a storage system. The proposed method may deliver better performance differentiation among the I/O request it is servicing. When an I/O request arrives at the component, the component will accept the I/O request for processing if it is not busy and priority is sufficient. A multi queue scheduler may be employed at places where common resource is accessed by more than one application. After processing is complete the component will transmit completion status to the next component in the storage system.

At step 402 of FIG. 4, the scheduler attached with the component may identify the I/O requests pending for processing. At step 404, the scheduler may create a plurality of I/O request queues based on a predetermined criteria. The predetermined criteria for creating a plurality of I/O request queues may be determined by the storage system administrator. The predetermined criteria for creating a plurality of I/O request queues may be based on the components of the host issuing the I/O requests. As an example an I/O request queue may be created corresponding to each application running on the host. As another example an I/O request queue may be created for each host issuing the I/O request. In yet another example, the I/O request queues may be created for each operating system layer issuing the I/O requests. The I/O request queues may also be created based on the priorities attached with the I/O request.

According to an example embodiment the scheduler may maintain statistics on the size of the I/O request queues. The size of the I/O request queues may comprise the number or the size (in bytes) of I/O request in an I/O request queue waiting to be scheduled on the component for processing. The scheduler may also maintain the statistics on the number of I/O request from the I/O request queues sent for processing on the component and processing is not complete. The scheduler may maintain the statistics on the number of I/O requests from the I/O request queue which are processed on the component. The above mentioned statistics may be maintained by the scheduler to assess the performance and the effectiveness of the scheduler employed with the component.

At step 406 of FIG. 4, a scheduling parameter manager attached to the scheduler and the component, may assign an initial scheduling parameters to the plurality of I/O request queues. The scheduling parameters are parameters based on which the I/O requests from a I/O request queue is assigned for processing on the component. The scheduling parameters may comprise a priority in form of numerical values (P0, P1, P2) or comparative values (high, medium, low). The scheduling parameter may also comprise a predetermined time slot for processing on the component for each I/O request queues. The scheduling parameter may further comprise a combination of a priority and a time slot for each I/O request queues.

At step 408 of FIG. 4, the initially assigned scheduling parameters are changed dynamically for the I/O request queues. The scheduling parameters may be changed by the scheduling parameter manager based on a feedback model and the turn around time for I/O requests. The change in scheduling parameters may lead to change in the turn around time for I/O requests queues. The scheduling parameters may be changed continuously based on the turn around time till the turn around time for the I/O requests is within a predetermined range.

At step 410 of FIG. 4, the I/O requests from the I/O request queues are sent to the component for processing. The I/O requests are sent for processing by the scheduler based on the scheduling parameters attached with the I/O request queues. The scheduler may maintain a statistics on the number of I/O request sent for processing and the number of I/O request processed for each I/O request queues.

At step 412 of FIG. 4, a turn around time for I/O requests for each I/O request queue is calculated. The I/O turn around time or a latency of servicing an I/O request may be computed using mathematical technique such as Little's Law. According to an example embodiment the latency of servicing an I/O request in a component of a storage system is the ratio of the I/O request processing rate of the component and the average number of I/O requests in the component. The average number of I/O requests in the component is the sum of average number of I/O requests waiting to be dispatched in a queue and the average number of I/O requests dispatched by the scheduler to the next stage of processing.

At step 414 of FIG. 4, the scheduling parameter manager may verify if the turn around time for the I/O request is within a predetermined range. The predetermined range for the turn around time for an I/O request is also referred to as optimal value of the turn around time this description. The optimal value of the turn around time may be predefined by the storage system administrator and can be dynamically modified. The optimal value of the turn around time may be defined for each I/O request queue.

At step 414, if the turn around time for the I/O request is not within the predetermined range, the scheduling parameters in step 408 is modified by the scheduling parameter manager to achieve the optimal turn around time. The scheduling parameter manager may dynamically change the scheduling parameter based on the difference in the calculated value of the turn around time and the predetermined range. The scheduling parameter manager may use a feedback mechanism to dynamically change the scheduling parameters of the I/O request queue and achieve the optimal turn around time.

Figure 5:
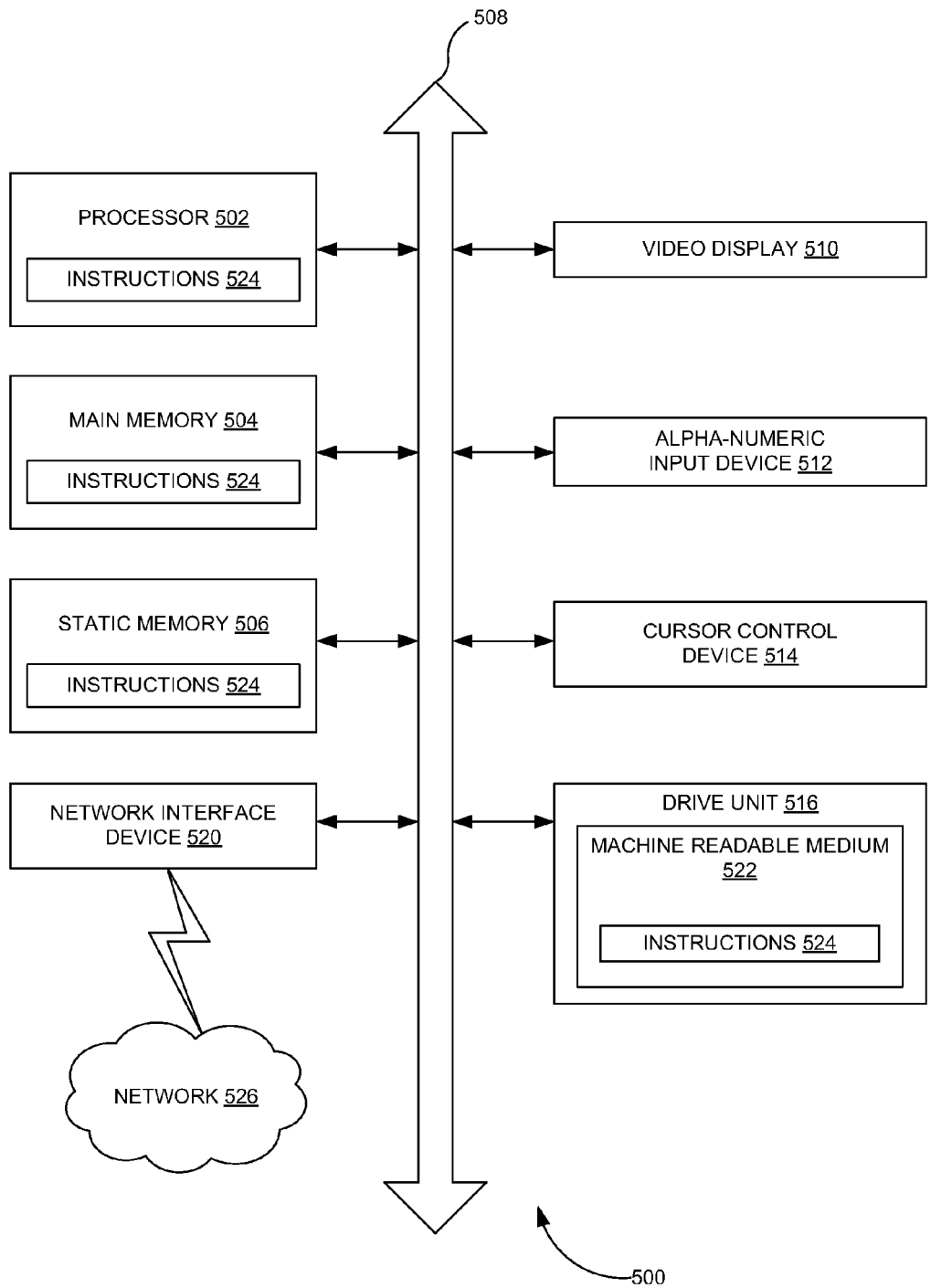
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific embodiments, it will be evident that various modifications and changes may be made to these embodiments without departing from the broader spirit and scope of the various embodiments. For example, the various devices, described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuits (ASIC)

The invention claimed is:

1. A method for managing I/O requests in a storage system comprising:
   identifying the I/O requests awaiting execution on at least one component of the storage system;
   creating a plurality of I/O request queues;

assigning an initial scheduling parameter to at least one of the plurality of I/O request queues;

scheduling the I/O requests from the one of the plurality of I/O request queues for processing on the component;

determining a turn around time for the one of the plurality of the I/O request queue arising from processing of I/O requests;

dynamically modifying the assigned scheduling parameters to the one of the plurality of I/O request queues to optimize the turn around time to within a predetermined range.

2. The method of claim 1 wherein determining turn around time for I/O requests from the one of the plurality of I/O request queues comprises determining the ratio of the I/O request processing rate and the average number of I/O requests in the component.

3. The method of claim 2, wherein the average number of I/O requests in the component is the sum of the average number of I/O requests in the I/O request queue and the average number of I/O requests scheduled for processing from the I/O request queue.

4. The method of claim 1 wherein creating I/O request queues based on a classifier defined by an administrator comprises creating I/O request queue based on the application initiating the I/O requests, operating system initiating the I/O request and the host initiating the I/O request.

5. The method of claim 1, wherein the components comprises disk device, a hypervisor, a network interface and a storage device.

6. A storage system comprising:
a scheduler connected to at least one component of a storage system, wherein the scheduler is configured to:
identify a plurality of I/O requests awaiting execution on the component;
create a plurality of I/O request queues;
schedule the I/O request on the component for processing based on a scheduling parameter;
a scheduling parameter manager, connected to the scheduler and the component, configured to:
assign initial scheduling parameters to the I/O request queues; determine a turn around time for each I/O request queue arising from processing of the I/O requests on the component; and dynamically modify the assigned priorities to optimize the turn around time for the I/O request to within a predetermined range.

7. The storage system of claim 6, wherein determining turn around time comprises determining the ratio of I/O request processing rate of the component and the average number of I/O requests in the component.

8. The storage system of claim 7, wherein the average number of I/O requests in the component is the sum of the average number of I/O requests in the I/O request queue and the average number of I/O requests scheduled for processing from the I/O request queue.

9. The storage system of claim 6, wherein creating I/O request queues based on parameters defined by an administrator comprises creating I/O request queue based on the application initiating the I/O requests, operating system initiating the I/O request and the host initiating the I/O request.

10. The storage system of claim 6, wherein the components comprise components involved in the processing of the I/O requests in the storage system.

11. The storage system of claim 6, wherein the scheduler is a multi queue scheduler.

12. The storage system of claim 6, wherein the turn around time is determined using little law.

13. A computer program product for managing I/O requests in a storage system, the computer program product comprising a non-transitory computer readable medium having program instructions recorded therein, which instructions, when read by a computer, cause the computer to configure in a storage system, a method for managing I/O requests comprising:
identifying the I/O requests awaiting execution on at least one component of the storage system;
creating a plurality of I/O request queues;
assigning an initial scheduling parameter to at least one of the plurality of I/O request queues;
scheduling the I/O requests from the one of the plurality of I/O request queues for processing on the component;
determining a turn around time for the one of the plurality of the I/O request queue arising from processing of I/O requests;
dynamically modifying the assigned scheduling parameters to the one of the plurality of I/O request queues to optimize the turn around time to within a predetermined range.

14. The computer program product of claim 13, wherein determining turn around time comprises determining the ratio of I/O request processing rate and the average number of I/O requests in the component.

15. The computer program product of claim 14, wherein the average number of I/O requests in the component is the sum of the average number of I/O requests in the I/O request queue and the average number of I/O requests scheduled for processing from the I/O request queue.

16. The computer program product of claim 13, wherein creating I/O request queues based on parameters defined by an administrator comprises creating I/O request queue based on the application initiating the I/O requests, operating system initiating the I/O request and the host initiating the I/O request.

17. The computer program product of claim 13, wherein the components comprise components involved in the processing of the I/O requests in the storage system.

18. The computer program product of claim 13, wherein the turn around time is determined using little law.

* * * * *